United States Patent
Han et al.

(10) Patent No.: US 11,422,564 B2
(45) Date of Patent: Aug. 23, 2022

(54) METHOD FOR MAKING SPACE MAP AND MOVING ROBOT

(71) Applicant: LG ELECTRONICS INC., Seoul (KR)

(72) Inventors: Soohyun Han, Gunpo-si (KR); Jung In Kwon, Seoul (KR); Mincheol Shin, Gwangmyeong-si (KR); Seung Hyun Song, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 16/832,667

(22) Filed: Mar. 27, 2020

(65) Prior Publication Data

US 2021/0208594 A1 Jul. 8, 2021

(30) Foreign Application Priority Data

Jan. 7, 2020 (KR) ........................ 10-2020-0001992

(51) Int. Cl.
*G05D 1/02* (2020.01)
*G05D 1/00* (2006.01)
(Continued)

(52) U.S. Cl.
CPC ......... *G05D 1/0219* (2013.01); *G01C 21/206* (2013.01); *G05D 1/0088* (2013.01);
(Continued)

(58) Field of Classification Search
CPC .. G01C 21/206; G05D 1/0088; G05D 1/0246; G05D 2201/0215; G06N 3/02; G06V 40/16
See application file for complete search history.

(56) References Cited

U.S. PATENT DOCUMENTS

| 7,373,218 B2 * | 5/2008 | Sakagami | H04N 7/185 |
| | | | 348/E7.086 |
| 2020/0250337 A1 * | 8/2020 | Armon | G06V 20/35 |

(Continued)

FOREIGN PATENT DOCUMENTS

| CN | 109522828 A * | 3/2019 | ......... G06K 9/00711 |
| GB | 2568278 A * | 5/2019 | ............... G06T 5/50 |

(Continued)

OTHER PUBLICATIONS

Denning et al.; "A Spotlight on Security and Privacy Risks with Future Household Robots: Attacks and Lessons"; UbiComp 2009; Sep. 30-Oct. 3, 2009; Orlando, FL; pp. 105-114 (Year: 2009).*

(Continued)

*Primary Examiner* — Michael J Zanelli
(74) *Attorney, Agent, or Firm* — Birch, Stewart, Kolasch & Birch, LLP (57) ABSTRACT

An image of a space in which a mobile robot travels may be captured, and, in the case in which personal information is included in the captured image, the image including the personal information may be covered with a specific color such that the personal information is not visible, and the image may be replaced with an image including no personal information. As a result, it is possible to prevent the personal information from being exposed. In order to determine whether personal information is included in an image and to replace the image including the personal information with an image including no personal information, an object detection neural network and a frame prediction neural network may be used. In addition, input and output of an image may be performed in an Internet of Things (IoT) environment using a 5G network.

16 Claims, 8 Drawing Sheets

(51) Int. Cl.
    *G01C 21/20* (2006.01)
    *G06V 40/16* (2022.01)
(52) U.S. Cl.
    CPC ......... *G05D 1/0253* (2013.01); *G05D 1/0274* (2013.01); *G06V 40/172* (2022.01); *G05D 2201/0215* (2013.01)

(56) References Cited

U.S. PATENT DOCUMENTS

2021/0012032 A1* 1/2021 Bishop ................ H04L 63/0428
2021/0065881 A1* 3/2021 Sargent ..................... G06T 7/11

FOREIGN PATENT DOCUMENTS

| KR | 10-2016-0086794 A | 7/2016 | |
| KR | 10-2019-0110498 A | 9/2019 | |
| WO | WO-2020058334 A1 * | 3/2020 | ........... G05D 1/0246 |

OTHER PUBLICATIONS

Ren et al.; "Learning to Anonymize Faces for Privacy Preserving Action Detection"; ECCV 2018; SpringerLink: https://link.springer.com/conference/eecv (Year: 2018).*

* cited by examiner

METHOD FOR MAKING SPACE MAP AND MOVING ROBOT

CROSS-REFERENCE TO RELATED APPLICATION

This present application claims benefit of priority to Korean Patent Application No. 10-2020-0001992, entitled "METHOD FOR MAKING SPACE MAP AND MOVING ROBOT," filed on Jan. 7, 2020, in the Korean Intellectual Property Office, the entire disclosure of which is incorporated herein by reference.

BACKGROUND

1. Technical Field

The present disclosure relates to technology capable of, in the case in which personal information is included in an image captured by a mobile robot while the mobile robot moves in a space, processing a first image frame including the personal information such that the personal information is not displayed and generating a map of the space including an alternative first image frame replacing the processed first image frame.

2. Description of Related Art

The following description is only for the purpose of providing background information related to embodiments of the present disclosure, and the contents to be described do not necessarily constitute related art.

Robots have been developed for use in industry, and have taken charge of part of factory automation. In recent years, applications using robots have further expanded, examples of which include medical robots and aerospace robots. In addition, domestic robots that are usable in general homes have also been developed. Among such robots, a robot that is capable of autonomously traveling is called a mobile robot.

Among mobile robots, a representative example of a mobile robot that is used in homes may be a robot cleaner. The robot cleaner may suction foreign matter, such as dust, from a floor while autonomously traveling in a zone to be cleaned without user manipulation. That is, the robot cleaner is a device that automatically cleans a zone to be cleaned.

Particularly, in order to clean a zone to be cleaned, the robot cleaner must generate a map of the zone to be cleaned. In order to generate such a map, an image of the zone to be cleaned may be captured, and then a traveling line along which the robot cleaner moves may be set based on the captured image.

At this time, personal information, such as an image including the face of an individual and identification (ID) information, may be included in the captured image. In particular, the captured image may be stored in an external server or in the robot cleaner, and the image including the personal information may be downloaded from the external server or from the robot cleaner, which may result in the personal information being exposed.

In connection therewith, Korean Patent Application Publication No. 10-2016-0086794, entitled ROBOT CLEANER AND METHOD FOR CONTROLLING THE SAME (hereinafter referred to as "related art 1"), discloses technology capable of enabling a robot cleaner to recognize a gesture recognition command of a user and to accurately acquire and recognize a user image through an enabled image capturer in order to accurately recognize and execute a command intended by the user.

Related art 1 discloses technology capable of determining the intention of a user through a captured image of an arm of the user. However, personal information may be exposed through the image, and technology capable of preventing the image including the personal information from being stored or used in order to prevent exposure of the personal information is not disclosed.

In addition, Korean Patent Application Publication No. 10-2019-0110498, entitled AN ARTIFICIAL INTELLIGENCE SERVER FOR PROCESSING DE-IDENTIFICATION OF UNSPECIFIC PERSON'S FACE AREA FROM IMAGE FILE AND METHOD FOR THE SAME (hereinafter referred to as "related art 2"), discloses technology capable of de-identifying a facial region of an unspecified personal information in an image file including a video clip or a photograph.

However, related art 2 does not concretely disclose technology capable of de-identifying a facial region of unspecified personal information that a user does not know in an image file including a video clip or a photograph and replacing the de-identified frame with an image matching with the surrounding environment.

Therefore, there is a need for technology capable of, in the case in which personal information is included in an image captured by a robot cleaner, processing the personal information and replacing the processed image with an image matching with a background before and after the image including the personal information.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE PRESENT DISCLOSURE

An aspect of the present disclosure is to process personal information included in an image captured by a mobile robot in order to prevent the personal information from being exposed through the image.

Another aspect of the present disclosure is to, in the case in which information about a subject captured by a mobile robot does not coincide with personal information included in an image, transmit the information about the subject to a user who uses the mobile robot, thereby improving security in use of the mobile robot.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

In order to accomplish the aspects, a spatial map information generation method according to an embodiment of the present disclosure may include receiving a plurality of image frames of a space, discriminating a first image frame comprising personal information from the image frames, processing the first image frame such that the personal information is not displayed, and storing a map of the space generated including an alternative first image frame replacing the processed first image frame.

Consequently, personal information included in an image captured by a mobile robot may be processed, whereby it is possible to prevent the personal information from being exposed through the image.

In addition, a mobile robot configured to generate spatial map information according to an embodiment of the present disclosure may include one or more processors and a memory connected to the processors.

Specifically, the memory may be configured to store a command configured to, when executed by the one or more processors, cause the one or more processors to receive a plurality of image frames of a space, discriminate a first image frame comprising personal information from the image frames, process the first image frame such that the personal information is not displayed, and store a map of the space generated including an alternative first image frame replacing the processed first image frame.

In addition, a mobile robot configured to generate spatial map information according to another embodiment of the present disclosure may include a main body, a driver configured to move the main body, an image capturer configured to capture an image of a space in which the main body is moved by the driver, a memory configured to store a plurality of image frames of the space captured by the image capturer; and a processor configured to, upon identifying personal information in a first image frame comprising the personal information, among the image frames, process the first image frame such that the personal information is not displayed and to store a map of the space generated including an alternative first image frame replacing the processed first image frame.

Consequently, the personal information included in the image captured by the mobile robot may be processed, whereby it is possible to prevent the personal information from being exposed through the image.

Other aspects and features than those described above will become apparent from the following drawings, claims, and detailed description of the present disclosure.

According to the present disclosure, a mobile robot may capture an image of a space in which the mobile robot moves using an image capturer included in the mobile robot. At this time, the image captured by the image capturer may include personal information. The included personal information may be information about a user who uses the mobile robot or a user who lives in the space. In the case in which the personal information is included in the image, the personal information in the image may be processed, whereby it is possible to prevent exposure of the personal information.

In addition, according to the present disclosure, the mobile robot may identify a subject. In the case in which information about the subject captured by the mobile robot does not coincide with personal information included in an image, the information about the subject may be transmitted to the user who uses the mobile robot, whereby it is possible to improve security in use of the mobile robot.

In addition, according to the present disclosure, a spatial map may be set using images including no personal information, whereby it is possible to more easily confirm objects which may collide with the mobile robot in the space. Consequently, it is possible to easily set spatial map information.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, the present disclosure will be described in detail with reference to the accompanying drawings.

Figure 1:
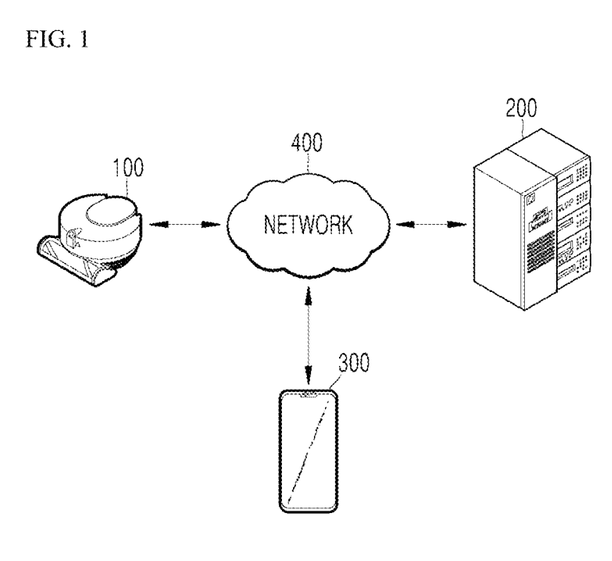
FIG. 1 is a diagram showing an example of a network environment for controlling a mobile robot according to an embodiment of the present disclosure.

FIG. 1 is a diagram showing an example of a network environment for controlling a mobile robot according to an embodiment of the present disclosure.

Referring to FIG. 1, a mobile robot 100 capable of moving in a space according to an embodiment of the present disclosure is communicatively connected to a user terminal 300 and to a server 200 over a network 400 configured to allow the mobile robot, the user terminal, and the server to communicate with each other.

The mobile robot 100, which is configured to move in a space based on set map information, may be an autonomous device. However, the mobile robot 100 may also be operated in a semi-autonomous mode or in a manual mode, in addition to an autonomous mode. In addition, a mobile robot capable of being trained based on machine learning and performing autonomous driving according to an embodiment of the present disclosure may be any one robot capable of being operated in an autonomous mode, a semi-autonomous mode, and the like, in addition to a cleaning robot.

The mobile robot 100 may be an autonomous robot configured to suction objects (for example, dust and waste) located in front of the mobile robot 100 while moving along a movement path.

The user terminal 300 may support object-to-object intelligent communication (such as Internet of Things (IoT), Internet of Everything (IoE), and Internet of Small Things (IoST)), and also may support communication such as machine to machine (M2M) communication and device to device (D2D) communication.

In addition, the user terminal 300 may set an image conversion scheme using big data, an artificial intelligence (AI) algorithm, and/or a machine learning algorithm in a 5G environment connected for the Internet of Things.

In addition, the user terminal 300 may be configured to include an embedded system as the Internet of Things. An example of the user terminal 300 may be any one of a user terminal or things disposed in a home configured to perform an artificial intelligence assistant function. For example, the user terminal 300 may be any one of a TV, an air conditioner, a robot cleaner, a refrigerator, and a washing machine; however, the present disclosure is not limited as to the kind of the user terminal 300.

In addition, the user terminal 300 may receive map information of a space in which the mobile robot 100 moves, and may receive information indicating whether the mobile robot 100 moves in the space according to predetermined conditions (for example, cleaning conditions) based on the map information. Furthermore, the user terminal 300 may receive an image of the space that the mobile robot 100 captures when the mobile robot 100 generates the map information for the action that the mobile robot 100 must perform, that is, cleaning, while the mobile robot 100 moves in the space.

To this end, the user terminal 300 may transmit and receive data to and from the server 200 over a 5G network. In particular, the user terminal 300 may perform data communication with the server 200 using at least one of Enhanced Mobile Broadband (eMBB), Ultra-reliable low latency communication (URLLC), or massive machine-type communication (mMTC) over the 5G network.

eMBB is a mobile broadband service, through which, for example, multimedia content and wireless data access are provided. In addition, more improved mobile services, such as a hotspot and broadband coverage for receiving mobile traffic that is explosively increasing, may be provided through eMBB. Large-capacity traffic may be received by an area having low user mobility and high density through a hotspot. A wide and stable wireless environment and user mobility may be guaranteed through broadband coverage.

URLLC defines requirements that are stricter than conventional LTE in terms of reliability in data transmission and reception and transmission delay, and corresponds to a 5G service for production process automation in industrial fields, remote medical examination and treatment, remote surgery operation, transportation, safety, and the like.

mMTC is a service that requires the transmission of a relatively small amount of data and is not sensitive to transmission delay. A much larger number of terminals than normal cellular phones, such as sensors, may simultaneously access a wireless access network through mMTC. In this case, communication modules of terminals must be moderate in price, and improved power efficiency and power saving technology is required such that the terminals can be operated for several years without changing batteries or recharging the batteries.

The network 400 may be any appropriate communication network, including wired and wireless networks, such as a local area network (LAN), a wide area network (WAN), the Internet, an intranet, and an extranet, and a mobile network, such as cellular, 3G, 4G LTE, 5G, Wi-Fi, an ad-hoc network, and a combination thereof.

The network 400 may include connection of network components, such as hubs, bridges, routers, switches, and gateways. The network 400 may include one or more connected networks, including a public network, such as the Internet, and a private network, such as a safe private business network, for example a multiple network environment. Access to the network 400 may be provided through one or more wired or wireless access networks.

The mobile robot 100, which is communicatively connected to the user terminal 300 and the server 200 over the network 400, captures an image of a space in order to perform cleaning. The image captured by the mobile robot 100 may include personal information in addition to an environment around the space. Since the personal information may be used by third parties, it is necessary to process the personal information in the captured image and to store the processed personal information.

To this end, it is necessary to determine and analyze whether personal information is included in the captured image. Upon determining that personal information is included in the captured image, the personal information is processed in the image, and the processed image may be replaced by an image similar to the surrounding space. As a result, it is possible to prevent an empty space from being generated when the mobile robot 100 determines the space through the image in order to set map information.

Technology for processing personal information in an image including personal information and replacing the processed personal information with an environment similar to the environment of the space around the personal information may be performed through a deep neural network having artificial intelligence technology applied thereto, various learning models, such as other machine learning models, and technology including the same.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning is a technology that investigates and constructs systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be a representative artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Learning paradigms of an ANN may be classified into supervised learning, unsupervised learning, semi-supervised learning, and reinforcement learning.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a learning method that trains an artificial neural network to discover a pattern within given training data and perform classification by using the discovered pattern, rather than by using a correlation between given training data and labels corresponding to the given training data.

Examples of unsupervised learning may include clustering and independent component analysis.

Examples of artificial neural networks using unsupervised learning may include a generative adversarial network (GAN) and an autoencoder (AE).

GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement learning may be performed primarily by a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the hyperparameters may be set to various values experimentally to learn artificial neural networks, and may be set to optimal values that provide stable learning rate and accuracy of the learning result.

Figure 2:
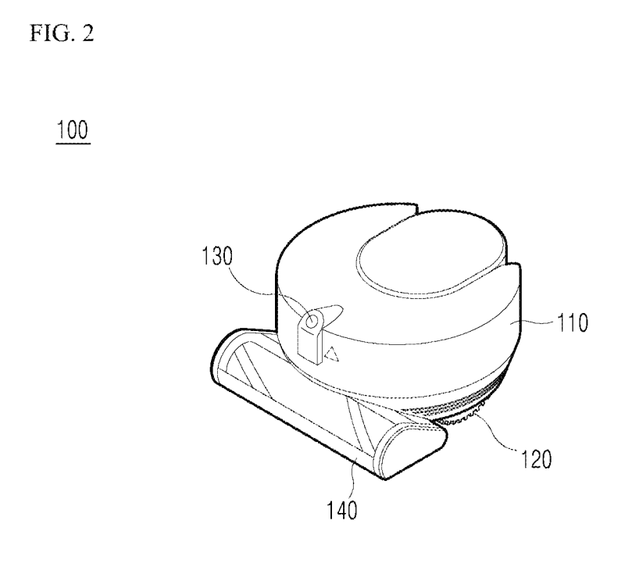
FIG. 2 is a diagram showing a mobile robot according to an embodiment of the present disclosure.
Figure 3:
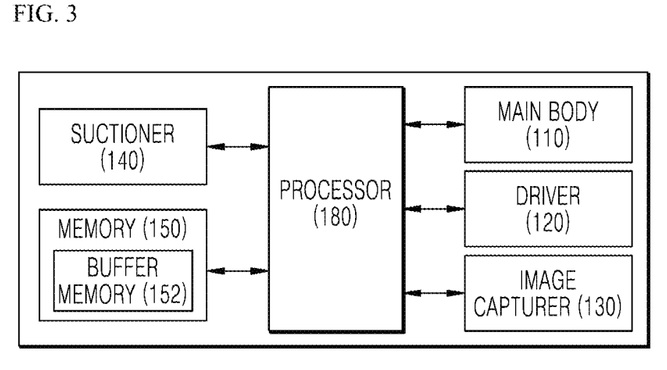
FIG. 3 is a diagram illustrating a system of the mobile robot of FIG. 2.

FIG. 2 is a diagram showing the mobile robot according to an embodiment of the present disclosure, and FIG. 3 is a diagram illustrating a system of the mobile robot of FIG. 2.

Referring to the figures, the mobile robot 100 may include a main body 110, which defines the exterior of the mobile robot 100, a driver 120 configured to drive the main body 110 such that the main body 110 can be moved and rotated, an image capturer 130 configured to capture an image of a space in which the main body 110 is moved by the driver 120, a memory 150 configured to store the image of the space captured by the image capturer 130, and a processor 180 configured to, when personal information in the image is sensed, process a frame including the personal information using an object detection neural network configured to discriminate the personal information included in the image.

Specifically, the main body 110 may be formed so as to have one of various shapes, such as a circular shape and a polygonal shape, and the shape of the main body 110 may be changed depending on conditions.

In addition, the main body 110 may include a suctioner 140 configured to suction a target distributed in a space, such as dust and foreign matter. In addition, the main body 110 may include a suction device (not shown) configured to suction the target through the suctioner 140 and a dust collection tank configured to collect the suctioned dust.

The main body 110 may further include a battery (not shown). The battery may supply electric power necessary for overall operation of the mobile robot 100 in addition to the driver 120, a description of which will follow. In the case in which the battery is discharged, it is possible to charge the battery. For example, when the battery is discharged, the mobile robot 100 may move to a charging dock (not shown) installed in the space in order to charge the battery with electricity. In particular, the mobile robot 100 may be configured to detect the position of the charging dock during return to the charging dock.

The driver 120 may include at least one driving wheel such that the main body 110 can be rotated and moved in the space. The driving wheel may be installed at one surface of the main body 110; however, the structure in which the driving wheel is installed may be changed depending on conditions. Meanwhile, the main body 110 or the driver 120 may include a separate driving motor capable of driving the driving wheel.

The image capturer 130, which is configured to sense the front of the main body 110, may be installed in the main body 110. The image capturer 130 may capture an image of the surroundings of the mobile robot 100, and information about the image captured by the image capturer 130 may be transmitted to the memory 150 and may be stored in the memory 150.

Specifically, the image capturer 130 may be located on the front surface of the main body 110. At this time, the image capturer 130 may include an upper camera capable of capturing an image of the upper side of the space and a lower camera capable of capturing an image of the bottom of the space.

The image captured by the image capturer 130 may be stored in the memory 150. The image stored in the memory 150 may become information of the space. The information of the space may be map information of the interior of a room, such as a house or an office, and, for example, may be information such as information on the shape of an indoor wall surface (for example, a shape such as a curved shape or a straight shape) and the entire area of the space.

The processor 180 may analyze the image captured by the image capturer 130. Specifically, the processor 180 may determine whether the image captured by the image capturer 130 includes personal information.

For example, in the case in which the image captured by the image capturer 130 includes no personal information, the image captured by the image capturer 130 may be transmitted to the memory 150 of the mobile robot 100 or to the server 200 without being changed. However, in the case in which the image captured by the image capturer 130 includes personal information, a frame including the personal information may be processed, and the processed frame may be replaced by a captured image of an environment similar to the surroundings of the processed frame at the position of the processed frame in order to generate an image such that no personal information is included in the captured image.

That is, a first image frame including personal information is processed such that the personal information is not exposed through the first image frame. After the first image frame including the personal information is processed, as described above, a map of the space may be generated and stored using a plurality of image frames including the processed result.

Meanwhile, in order to determine whether the captured image includes personal information, whether the image includes personal information may be determined through a personal information identification neural network.

Specifically, the personal information identification neural network is a neural network configured to be trained with, for example, faces of people and portions of bodies of people from images, and to determine, when an image captured by the image capturer 130 includes, for example, the face of a person and the portion of a body of a person, that the image includes personal information based on the result of learning.

Upon determining that the image includes personal information, an image frame including the personal information may be processed. Processing the image frame including the personal information means filling a first image frame including the personal information with a specific color in order to prevent exposure of the personal information.

Specifically, filling an image frame including personal information with a specific color means covering the entirety of a first image frame including personal information with a specific color (for example, black) or covering only the personal information region of the first image frame with a specific color in order to hide the personal information.

Upon determining that the personal information is included in the first image frame captured by the image capturer 130, as described above, an image matching with the surrounding environment may be inputted to the processed frame using a frame prediction neural network.

Specifically, the frame prediction neural network may acquire a data set about all images captured by the image capturer 130, and may be trained with the acquired data set. Subsequently, an image matching with the frame processed based on the trained information may be predicted based on an image frame before the processed frame and an image frame after the processed frame.

In the case in which the image including the personal information is captured, as described above, the personal information region is filled with a specific color in order to process the personal information region, or the entirety of the first image frame including the personal information is filled with a specific color in order to hide the personal information. Subsequently, the first image frame filled with the specific color is replaced with an alternative image through an image frame before the processed frame and an image frame after the processed frame. As a result, it is possible to prevent the image including the personal information from being transmitted to a mobile robot that is used by a third party other than the user who uses the mobile robot 100 or to a user terminal of the third party, thereby preventing exposure of the personal information.

Meanwhile, when the personal information is processed in the first image frame including the personal information, the first image frame may be processed upon determining that at least one of an image including the face of an individual or an image including identification (ID) information is included.

In the case in which the user of the mobile robot 100 is included in the first image frame, for example, in the case in which an image including the face of the user or identification (ID) information based on which the face of the user can be recognized is captured, it is preferable to process the first image frame. By contrast, in the case in which an image of less than about 20% of the face of the user is captured, in the case in which an image of less than about 20% of the identification (ID) information is captured, or in the case in which an image of only a portion of the body of the user (for example, arms, legs, and fingers) is captured, the user is not recognized. In this case, therefore, the image frame is not determined to be the first image frame in which the personal information must be processed, and thus no processing procedure is performed.

In an embodiment of the present disclosure, an example in which setting is performed in order to process a first image frame in the case in which an image of 70% or more of the face of the user or 70% or more of the identification information is captured so as to be recognized as personal information in the image including the face of the user and the identification information of the user in order to process the first image frame will be described. However, conditions for processing the first image frame may be changed depending on the conditions of the present disclosure.

In addition, when the processor 180 determines whether personal information is included in an image, facial recognition may be performed based on person information included in personal information that is inputted in advance.

Specifically, the user of the mobile robot 100 may receive an image captured by the image capturer 130 of the mobile robot 100 through the user terminal 300 in real time.

At this time, in the case in which the received image includes a third party in addition to the user who uses the mobile robot 100, it may be determined that the third party is located in the space in addition to the user.

To this end, personal information of users may be inputted in advance. The inputted information may be facial information of each of the users. Facial information in personal information included in an image is compared with the inputted facial information, and, in the case in which the facial information of the personal information included in the image does not coincide with the inputted facial information, the user may be notified through the user terminal 300 that personal information of a person other than the user has appeared in the space.

After the first image frame including the personal information is processed, as described above, a plurality of image frames captured by the image capturer 130 may be stored in a buffer memory 152.

The buffer memory 152 is an element configured to output an image signal to a display. The buffer memory 152 includes at least one screen quantity of screen data converted into pixel expression, and may output memory content as a bit string according to a signal.

In the case in which the image frames stored in the buffer memory 152 exceed the capacity of the buffer memory 152, the image frames stored in the buffer memory 152 may be transmitted to an external server. At this time, the external server may be the server 200 described above, or may be any one of servers communicatively connected over the network 400.

Meanwhile, the buffer memory 152 may be communicatively connected to the external server, and may receive the image frames stored in the external server as needed.

After the image frames stored in the buffer memory 152 are transmitted to the external server, the buffer memory 152 may be reset such that a plurality of other image frames can be stored in the buffer memory 152.

Figure 4:
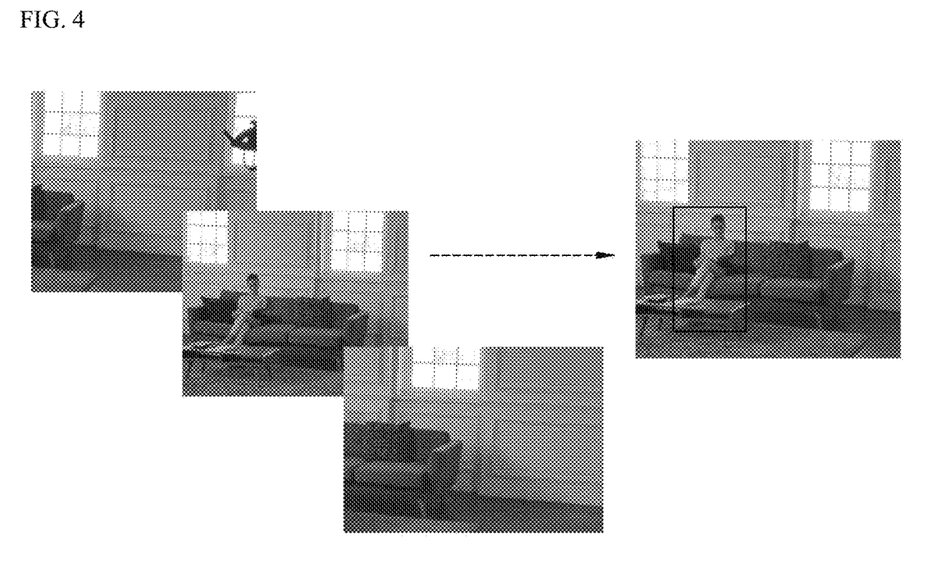
FIG. 4 is a diagram illustrating a personal information recognition neural network according to an embodiment of the present disclosure.
Figure 5:
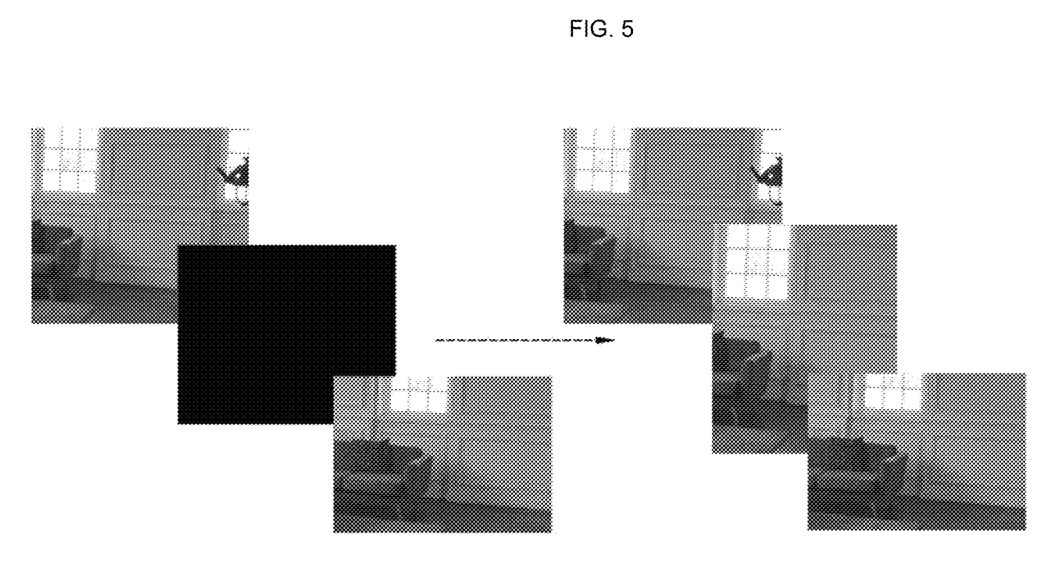
FIGS. 5 and 6 are diagrams illustrating examples in which a captured image including personal information is processed according to an embodiment of the present disclosure.
Figure 6:
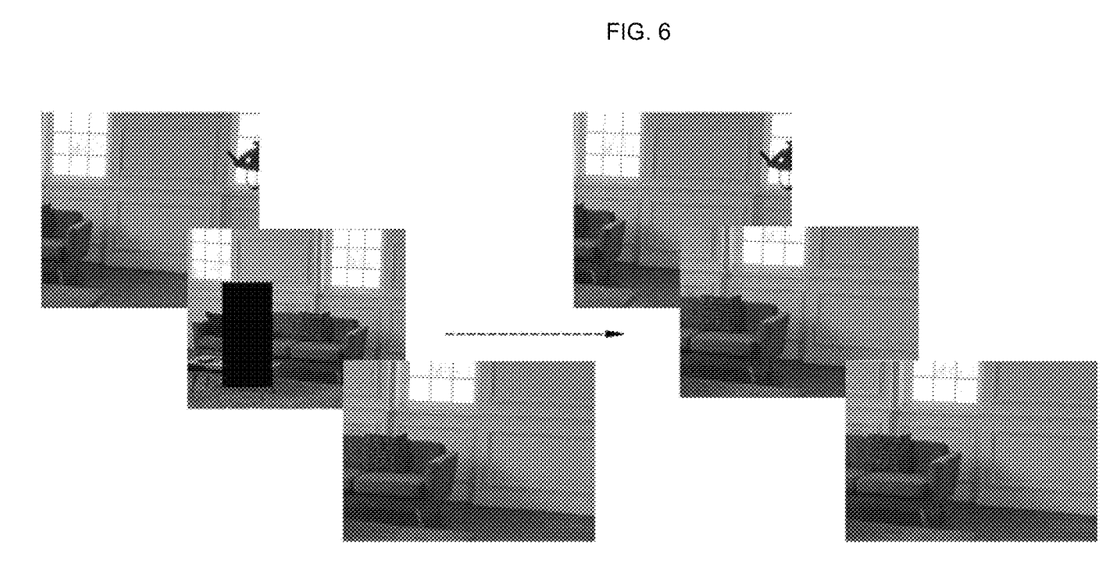
Figure 7:
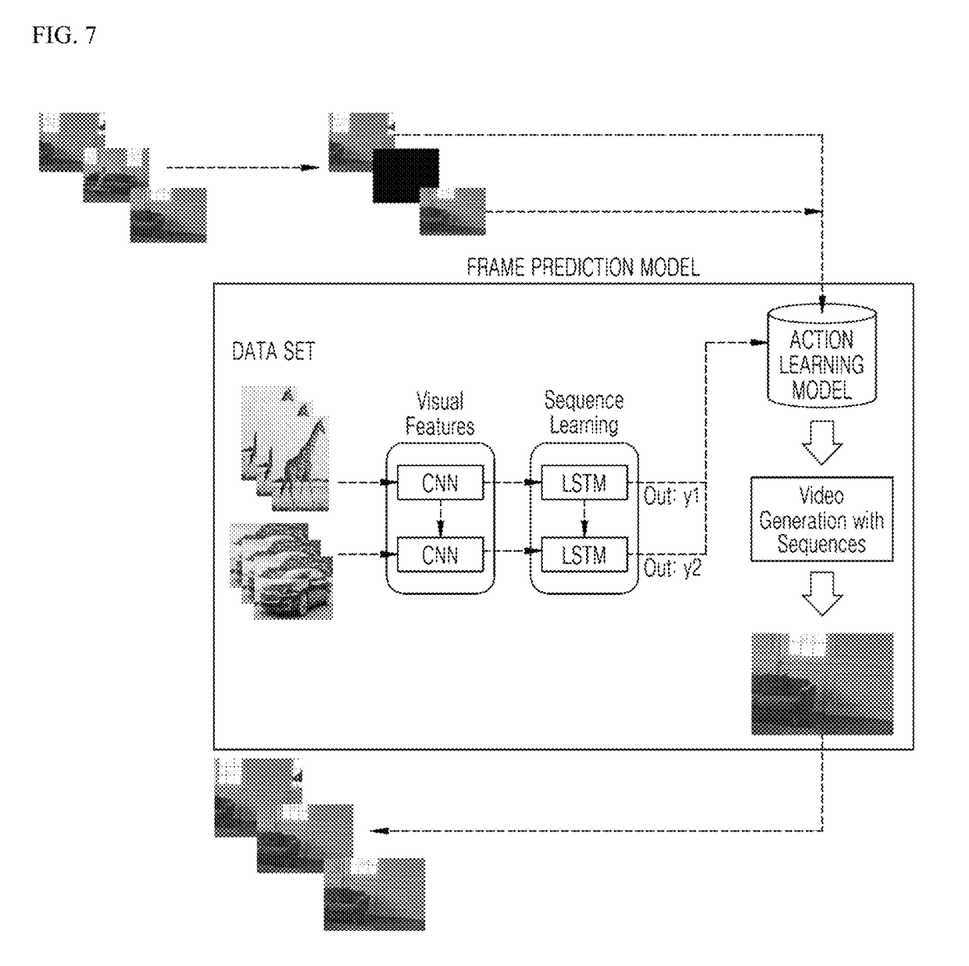
FIG. 7 is a diagram illustrating a frame prediction neural network according to an embodiment of the present disclosure.

FIG. 4 is a diagram illustrating a personal information recognition neural network according to an embodiment of the present disclosure, FIGS. 5 and 6 are diagrams illustrating examples in which a captured image including personal information is processed according to an embodiment of the present disclosure, and FIG. 7 is a diagram illustrating a frame prediction neural network according to an embodiment of the present disclosure.

Referring to the figures, a process of determining the position at which personal information is located in a plurality of images captured by the mobile robot 100 is shown.

Specifically, a face, a body region, or the like must be recognized in order to recognize personal information among objects in an image using a personal information identification neural network, which is an object detection neural network. To this end, whether personal information is present may be classified using a classification method, the position of an object as the personal information may be found, objects other than the personal information may be detected using a detection method, and the shape of the object as the personal information may be segmented using a segmentation method.

The personal information identification neural network is a neural network capable of grasping the position of a plurality of objects in an image and at the same time classifying the objects in order to recognize various objects in the image.

In addition, the personal information identification neural network may collect similar pixels calculated by a plurality of weights in a given image through a region proposal algorithm, such as selective search, in order to generate a region.

Specifically, progress is performed in a bottom-up scheme, in which several small regions may be generated at first and in which a single region is formed for a single object based on the degree of similarity through a greedy algorithm.

Generated regions may be classified in order to discriminate a corresponding object, and the object may be detected through deep learning in an object discrimination process.

At this time, when an object as personal information is detected, it may be determined whether a portion of an image including a face corresponding to the personal information and identification (ID) information is exposed by a predetermined threshold value or more. That is, in the case in which an image of only a portion of the body is captured by the mobile robot 100 and thus it is not possible to confirm whether personal information included in the captured image is personal information about an arm or a leg, it is not possible to accurately determine the personal information based on the captured image of the body. Consequently, setting may be performed in advance such that, in the case in which only a portion of the body is exposed, personal information is not determined to be exposed, and that personal information is determined to be sensed only in the case in which an image of 70% or more of the face is captured or an image of 70% or more of the ID information is captured.

Similarly, in the case in which the face as personal information is exposed by the predetermined threshold value or less, that is, in the case in which the face is exposed by a predetermined area or less in the captured image, the captured image may be stored in the memory 150 of the mobile robot 100 or in the server 200 without being changed so as to be used as data necessary to set map information.

At this time, the described threshold value may be changed depending on conditions for hiding the personal information. In an embodiment of the present disclosure, an example in which the personal information is determined to be sensed in the case in which the face of the user or the ID information is exposed by 70% or more is given; however, this condition does not limit the embodiment of the present disclosure.

Meanwhile, in the case in which an image including personal information is sensed through the object detection neural network, the entirety of the image including the personal information or only a personal information region may be filled with a specific color, as shown in FIGS. 5 and 6. For example, the entirety of the image including the personal information is filled with a specific color, such as black, such that an image corresponding to the personal information is not seen.

In the case in which the entirety of the image including the personal information or only the personal information region is filled with a specific color, such as black, as described above, the image filled with black is replaced by another image.

Specifically, an alternative Tillable image is predicted based on the image including the personal information, a front image, and a rear image using a video generation model of the frame prediction neural network, and the predicted image is inputted in place of the image filled with black.

After the image including the personal information is replaced by an image including an object, as described above, the image including the personal information may be stored in the memory 150 of the mobile robot 100 or in the server 200, whereby it is possible to prevent the image including the personal information from being included in an image that sets a spatial map.

In addition, the spatial map may be set using images including no personal information, whereby it is possible to more easily confirm objects which may collide with the mobile robot 100 in the space. Consequently, it is possible to easily set spatial map information.

Figure 8:
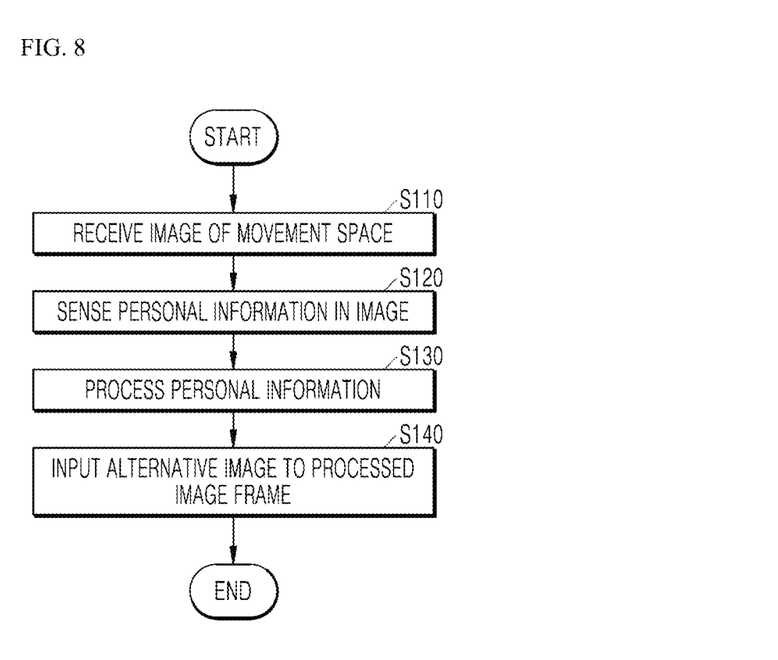
FIG. 8 is a flowchart illustrating a map precision setting process of a mobile robot according to an embodiment of the present disclosure.

FIG. 8 is a flowchart illustrating a map precision setting process of the mobile robot according to the embodiment of the present disclosure.

First, the mobile robot 100 may receive an image of the interior of a space captured by the image capturer 130 installed at the front of the main body 110 (S110).

The received image may be an image of the environment of the space, and a map based on which the mobile robot 100 moves in the space may be set through the received image.

At this time, it is possible to sense whether the received image includes personal information (S120). Upon sensing that the image includes personal information, a frame including the personal information is processed, and the processed frame is replaced with an environment similar to the surroundings of the processed frame, whereby an image may be generated such that the personal information is not included in the captured image (S130).

By contrast, in the case in which the image captured by the image capturer 130 includes no personal information, the image captured by the image capturer 130 may be transmitted to the memory 150 of the mobile robot 100 or to the server 200 without being changed.

To this end, the personal information identification neural network is trained with, for example, faces of people and portions of bodies of people from images, and determines, when an image captured by the image capturer 130 includes an image including the face of the person and identification (ID) information, that the image includes personal information based on the result of the training.

Upon determining that the image includes personal information, a frame including the personal information may be processed. Here, personal information processing means filling a first image frame including personal information with a specific color in order to prevent exposure of the personal information.

Specifically, only personal information in the image may be deformed or generated using a specific color (for example, black), or the entirety of the first image frame including the personal information may be deformed or generated using a specific color (for example, black), Upon determining that the image captured by the image capturer 130 includes personal information, as described above, an image matching with the surrounding environment is inputted to the processed frame using the frame prediction neural network such that the image including the personal information acts as the entire image between a front image including the personal information and a rear image including the personal information, without resulting in any unnaturalness in the image.

In the case in which the image including the personal information is captured, as described above, a personal information region is processed or the image including the personal information is processed, and then an image capable of matching with the processed image is inputted through an image frame before the processed image and an image frame after the processed image (S140). As a result, it is possible to prevent the image including the personal information from being transmitted to a mobile robot that is used by a third party other than the user who uses the mobile robot 100 or to a user terminal of the third party, thereby preventing exposure of the personal information.

In the case in which the image including the personal information is captured, the personal information region may be processed or the image including the personal information may be processed, an image capable of replacing the processed image may be inputted through an image frame before the processed image and an image frame after the processed image, and a captured image including only the spatial environment may be transmitted to the server 200 or the memory of the mobile robot 100 so as to be stored therein.

The stored image including only the spatial environment may be information capable of setting spatial map information, and may be data information with improved security, since the image includes no personal information.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A spatial map information generation method performed by a processor, the spatial map information generation method comprising:
   receiving a plurality of image frames of a space;
   discriminating a first image frame comprising personal information from the image frames;
   processing the first image frame so that the personal information is not displayed; and
   storing a map of the space generated using the image frames comprising a result of processing the first image frame,
   wherein the discriminating comprises determining whether at least one of an image of a face of an individual or an image comprising identification (ID) information is included in the image frame based on a personal information identification neural network.

2. The spatial map information generation method according to claim 1, wherein the processing comprises filling the image of the face of the individual or the image comprising the identification (ID) information in the first image frame comprising at least one of the image of the face of the individual or the image comprising the identification information with a specific color in order to hide the personal information.

3. The spatial map information generation method according to claim 1, wherein
   the personal information comprises person information, and
   the spatial map information generation method further comprises identifying a subject through facial recognition based on the personal information identification neural network.

4. The spatial map information generation method according to claim 1, wherein the processing comprises filling the first image frame with a specific color.

5. A spatial map information generation method performed by a processor, the spatial map information generation method comprising:
   receiving a plurality of image frames of a space;
   discriminating a first image frame comprising personal information from the image frames;
   processing the first image frame so that the personal information is not displayed; and
   storing a map of the space generated using the image frames comprising a result of processing the first image frame, wherein
   the processing comprises replacing the first image frame with an alternative first image frame, and
   the alternative first image frame is an image predicted based on an image frame before the first image frame and an image frame after the first image frame using a frame prediction neural network.

6. A spatial map information generation method performed by a processor, the spatial map information generation method comprising:
   receiving a plurality of image frames of a space;
   discriminating a first image frame comprising personal information from the image frames;
   processing the first image frame so that the personal information is not displayed; and
   storing a map of the space generated using the image frames comprising a result of processing the first image frame, wherein the spatial map information generation method further comprises:

after the processing, storing the image frames in a buffer memory;

transmitting the image frames stored in the buffer memory to an external server in a case in which the image frames stored in the buffer memory exceed a capacity of the buffer memory; and resetting the buffer memory.

7. A mobile robot configured to generate spatial map information, the mobile robot comprising:

one or more processors; and a memory connected to the one or more processors, wherein the memory stores a command configured to, when executed by the one or more processors, cause the one or more processors to:

receive a plurality of image frames of a space;

discriminate a first image frame comprising personal information from the image frames;

process the first image frame so that the personal information is not displayed; and store a map of the space generated using the image frames comprising a result of processing the first image frame, wherein the memory stores a command configured to cause the one or more processors to determine whether at least one of an image of a face of an individual or an image comprising identification (ID) information is included in the image frame based on a personal information identification neural network.

8. The mobile robot according to claim 7, wherein the memory stores a command configured to cause the one or more processors to fill the image of the face of the individual or the image comprising the identification (ID) information in the first image frame comprising at least one of the image of the face of the individual or the image comprising the identification information with a specific color in order to hide the personal information.

9. The mobile robot according to claim 7, wherein the personal information comprises person information, and the memory stores a command configured to cause the one or more processors to identify a subject through facial recognition based on the personal information identification neural network.

10. The mobile robot according to claim 7, wherein the memory stores a command configured to cause the one or more processors to fill the first image frame with a specific color.

11. The mobile robot according to claim 10, wherein the memory stores a command configured to cause the one or more processors to:

replace the first image frame with an alternative first image frame; and predict the alternative first image frame based on an image frame before the first image frame and an image frame after the first image frame using a frame prediction neural network.

12. The mobile robot according to claim 7, wherein the memory stores a command configured to cause the one or more processors to:

store the image frames in a buffer memory;

transmit the image frames stored in the buffer memory to an external server in a case in which the image frames stored in the buffer memory exceed a capacity of the buffer memory; and reset the buffer memory.

13. A mobile robot configured to generate spatial map information, the mobile robot comprising:

a main body;

a driver configured to move the main body;

an image capturer configured to capture an image of a space in which the main body is moved by the driver;

a memory configured to store a plurality of image frames of the space captured by the image capturer; and a processor configured to, upon identifying personal information in a first image frame comprising the personal information, among the image frames, process the first image frame so that the personal information is not displayed and to store a map of the space generated using the image frames comprising a result of processing the first image frame, wherein the processor is configured to determine whether at least one of an image of a face of an individual or an image comprising identification (ID) information is included in the image frame based on a personal information identification neural network.

14. The mobile robot according to claim 13, wherein the processor is configured to fill the image of the face of the individual or the image comprising the identification (ID) information in the first image frame comprising at least one of the image of the face of the individual or the image comprising the identification information with a specific color in order to hide the personal information.

15. The mobile robot according to claim 13, wherein the personal information comprises person information, and the processor is configured to identify a subject through facial recognition based on the personal information identification neural network.

16. The mobile robot according to claim 13, further comprising:

a buffer memory configured to store the image frames comprising the result of processing the first image frame and to transmit the stored image frames comprising the result of processing the first image frame to an external server in a case in which the image frames stored in the buffer memory exceed a capacity of the buffer memory.

* * * * *